United States Patent Office 3,316,110
Patented Apr. 25, 1967

3,316,110
REFRACTORY COMPOSITIONS AND PROCESSES
Harold J. Herbst, Wheat Ridge, Colo., and John E. Lyon, Florissant, Mo., assignors to Monsanto Company, St. Louis, Mo., a corporation of Delaware
No Drawing. Filed Oct. 7, 1964, Ser. No. 402,345
15 Claims. (Cl. 106—65)

The present invention relates to novel refractory compositions and to methods for preparing such compositions. The present invention more particularly relates to moldable refractory compositions which, when heated, provide refractory articles having refractories of improved bond strengths.

Refractory materials are widely used in industry and frequently the refractory is needed for use at temperatures between 1500° C. and 1900° C. To be satisfactory for most uses at high temperatures a refractory material should be strong, durable and capable of withstanding thermal shock. The refractory should also be substantially inert when contacted with foreign substances such as water or corrosive materials, oxidizing or reducing atmospheres, and the like, encountered in furnaces in which mineral ores are processes, and also encountered in ducts for exhausting hot gases.

Refractories such as fire clay-based refractories have proven unsatisfactory at temperatures above 1600° C. because (1) they become thermo-plastic, (2) and/or cannot withstand the thermal shock, (3) and/or are not inert to corrosive substances such as for example alkali. Other available refractories consist of refractory metal oxides such as finely divided oxides of aluminum, iron, manganese, titanium, zirconium and hafnium oxides which are bonded together by bonding agents such as alkali metal silicates and acids such as phosphoric acid. Generally, particles of refractory metal oxides do not cohere until heated to a temperature of from about 1400° C. to about 1500° C. at which temperature they fuse to form a ceramic bond. To hold the particles of refractory metal oxides together until a ceramic bond is formed, chemical bonding agents such as sodium silicate or phosphoric acid, which react with the refractory metal oxides to form a cementing agent, are employed. However, alkali metal silicates are employed as fluxes in refractories and in many instances the refractory compositions containing them have a tendency to slump or shrink when fired. Phosphoric acids are recognized as superior bonding agents for refractory metal oxides because they are non-fluxing and because they impart a strong initial bond over a wide temperature range up to the temperature point where ceramic bonding occurs. However, phosphoric acids possess certain disadvantages in that, when mixed with refractory metal oxides, the mixture hardens in a relatively short period of time and such mixture cannot be pressed into bricks or employed as ramming mixes. Although the reasons for this premature hardening are not known with certainty it is believed that the hardening is caused by the reaction of phosphoric acids with metal oxides to form insoluble compounds which "dry" and harden the mixture.

It has been proposed heretofore in U.S. Patent 2,702,-425, patented Feb. 22, 1955, to add an anhydrous acid, containing phosphorus in the acid radical, to refractory metal oxides under stringent anhydrous conditions to provide a phosphate bond for these materials. According to this patent the presence of any water in a mixture, comprising an acidic phosphate and a metallic oxide is detrimental to the production of sound, hard, imporous, water resistant molded products, (e.g. bricks). Further according to this patent the molding material is prepared by mixing the anhydrous phosphoric acid with a completely dry metallic oxide under controlled conditions so that a partially chemically reactive molding material is obtained. Such molding material may be suitably sized and prepared for shipment or storage and thereafter used for molding a variety of heat resistant, hard, sound, imporous parts by subjecting the material to the simultaneous application of heat and pressure. Such molding materials may be suitably employed as a ramming mix to repair cracked walls in ore processing furnaces or may be molded into bricks which may be used to line the walls of ore processing and other furnaces.

However, the compositions of the above-mentioned patent are expensive to prepare and difficult to handle under the ordinary shipping conditions found in commerce in which contact with moisture, even when special precautions are taken, is difficult to avoid.

If such compositions are not maintained under completely anhydrous conditions they will lose their workability or moldability and set up into hard masses from which it is impossible to form ceramic articles of desired configuration. Conversely, if phosphoric acid is omitted from such compositions and an attempt is made to prepare a refractory article therefrom such article will be friable and tend to powder and lose its configuration due to the absence of the (phosphate) bonding agent. Usually when a refractory metal oxide such as alumina is employed in combination with a phosphoric acid the mixture must be prepared immediately prior to molding or the material will harden and become unworkable. This is probably due to a reaction between the phosphoric acid and the refractory metal oxide to form a phosphate salt which is usually solid.

It has presently been found that such hardening and unworkability of mixtures of a refractory metal oxide and acids of phosphorus oxides, containing some water, are prevented by the addition of a polycarboxylic acid to the composition during its preparation or immediately thereafter. The addition of the polycarboxylic acid enables the refractory composition to be maintained in a moldable state for prolonged periods of time, that is, periods up to six months or longer.

In accordance with the present invention it has been found possible to provide moldable refractory metal oxide compositions containing phosphoric acid together with some water which will not harden for prolonged periods of time, e.g. up to six months or longer and which, when molded and heated, produce refractory shapes of improved and superior strength due to the maximum utilization of the phosphate bond.

It is one object of this invention to provide stable moldable compositions which are suitable for the manufacture of refractories.

It is another object of this invention to provide processes for preparing these compositions.

It is a further object of this invention to provide refractories, particularly formed from refractory metal oxides, having superior strength and resistance to corrosion than other heretofore known refractories.

Still further objects and advantages of this invention will become apparent from the following description and the appended claims.

The present invention provides, inter alia, compositions suitable for the manufacture of refractories comprising a mixture of (1) water, (2) from about 25% to about 90% by weight of a particulate refractory metal oxide, (3) an acid of a phosphorus oxide and (4) an amount of a polycarboxylic acid sufficient to maintain the compositions in a moldable state. Such compositions remain in a moldable state for periods up to six months or longer and can thereafter be shaped into ceramic forms, rammed into the crevices of furnaces or molded into bricks or tiles which, after firing by conventional methods provide high strength, inert, corrosion resistant, refractory articles.

The amount of water employed in the compositions of the present invention may vary to a considerable extent and is usually an amount sufficient to provide the desired degree of workability or moldability. In the finished compositions amounts of water in the range of from about 1 to about 10% preferably from about 3 to about 7% by weight may be generally employed. If more than 10% by weight of water is employed the final composition usually will be too fluid and sometimes may have the consistency of a "thick soup" rather than a mass which is mechanically deformable, e.g. moldable. On the other hand if less than 1% by weight of water is employed the final compositions tend to be too stiff and tend to become hard when stored.

A wide variety of particulate refractory metal oxides may be employed in the compositions of this invention including, for example, oxides of aluminum, iron, magnesium, manganese, titanium, chromium, zirconium, hafnium and mixtures thereof. Generally, the particular or specific refractory metal oxide employed will depend upon the properties desired in the refractory article to be prepared and the intended end use of the refractory article. When it is desired or intended to use the compositions of this invention to form refractory mixtures suitable for use in lining ore furnaces, such as for example a refractory "plaster" or a brick, the final refractory must have thermal stability and be inert to attack by corrosive gases or liquids. In such compositions certain metal oxides such as oxides of aluminum, titanium, chromium, hafnium and zirconium are preferred, and oxides of aluminum are particularly preferred.

The refractory metal oxides employed in the compositions of this invention are most advantageously refractory metal oxides which are in the crystalline state, that is, they have not been heated to temperatures at which they undergo phase transition or tend to pass to the fused, non-crystalline, amorphous state. Such refractory metal oxides are, as noted hereinbefore, in a particulate state, that is, they preferably are composed of mixtures of particles ranging in size from small size particles of several hundred millimicrons in diameter to particles having a size such that they will pass through a No. 4 mesh U.S. Standard screen. The particle size and particle size distribution of the refractory metal oxides will depend to some extent on the end use of the composition and the refractory article which it is desired to produce. By way of example if it is desired to produce a ceramic shell mould suitable for precision metal casting the particles will usually be small (e.g. in the micron range) and the composition will be composed of particles in a finely divided state. However, when it is desired to use the compositions as ramming mixes for repairing ore furnace walls or to form refractory bricks which can be used to line ore furnace walls the refractory metal oxides preferably are composed of particles having a particle size and particle size distribution such that substantially all of the particles will pass through a No. 4 mesh U.S. Standard screen, from about 10 to about 20% by weight of said particles will be retained on a No. 8 mesh U.S. Standard screen, from about 10 to about 35% by weight of the particles will be retained on a No. 14 mesh U.S. Standard screen, from about 20 to about 50% by weight of said particles will be retained on a No. 20 mesh U.S. Standard screen, from about 40 to about 85% by weight of said particles will be retained on a No. 45 mesh U.S. Standard screen, from about 45 to about 90% by weight of the particles will be retained on a No. 70 mesh U.S. Standard screen, from about 50 to about 90% by weight of the particles will be retained on a No. 100 mesh U.S. Standard screen and from about 70 to about 98% by weight of the particles will be retained on a No. 200 mesh U.S. Standard screen.

The particle size and particle size distribution of the particles of the refractory metal oxides may vary considerably within the above ranges. Although the particle size and particle size distribution encompasses a considerable range it has been found that such wide particle size distribution will form more stable refractory compositions which can be stored over a longer period of time than is the case when the particles are of a more standard particle size, that is, have a narrower range of particle size distribution. The reason for this stability within the broad range of particle size and particle size distribution of refractory metal oxides in the compositions of this invention is not known with certainty nor is there any apparent scientific explanation therefor.

Refractory metal oxides within the above-described particle size ranges and particle size distributions which are particularly preferred for use in the compositions of this invention when such compositions are to be used to prepare thermally resistant refractories include oxides of aluminum in the crystalline state or mixtures of oxides of aluminum in the crystalline and/or amorphous states. Particularly preferred oxides of aluminum are those commonly referred to as calcined or partially hydrated aluminas. Mixtures of aluminas such as bauxite or chemically purified aluminas, at least a portion of which are in the hydrous state, are particularly advantageous and preferred. Such alumina will be sometimes hereinafter referred to for purposes of convenience of description as reactive alumina.

The amount of the above-described particulate refractory metal oxides employed in the compositions of this invention may vary considerably depending upon the refractory article desired and is usually an amount in the range of from about 25% to about 90% by weight, based on the total weight of the finished composition. If the refractory metal oxide is the sole water-insoluble component employed in the composition, the amount of such refractory metal oxide will usually be from about 70% to about 90% by weight of the composition and when the refractory metal oxide is used in conjunction with one of the hereinafter described refractory clays the amount of metal oxide employed may vary in the range of from about 25 to about 85% by weight. If more than 90% by weight of refractory metal oxide and/or refractory metal oxide and clay is employed there is usually not enough phosphoric acid to provide a sufficient bond during and prior to the formation of the refractory article. If less than 25% by weight of such metal oxide is employed the composition usually will be either too fluid to be moldable or the finished refractory article made therefrom will not be thermally resistant and will tend to crumble upon repeated use.

As noted hereinbefore the binding agent employed in the compositions of this invention is an acid of a phosphorus oxide. A wide variety of such acids may be employed including orthophosphoric acid ($H_3PO_4$), pyrophosphoric acid ($H_4P_2O_7$), metaphosphoric acid ($HPO_3$), orthophosphorous acid ($H_3PO_3$), pyrophosphorous acid ($H_4P_2O_5$) and other such acids of condensed phosphorus oxides and the like. It has been found most advantageous to employ in the compositions of this invention orthophosphoric acid, pyrophosphoric acid and mixtures thereof, and orthophosphoric acid is particularly preferred.

The amount of the acid of a phosphorus oxide which may be employed in the compositions of this invention may vary considerably depending upon a number of factors such as, for example, the particular acid employed, the particular refractory metal oxide employed, the particle size and particle size distribution of such refractory metal oxide and the refractory article which it is desired to obtain. Generally, the amount of such acid of a phosphorus oxide will be in the range of from about 1% to about 8% by weight, based on the weight of the finished composition, and, as will be evident hereinafter, is preferably an amount in the range of from about 3% to about 5% by weight. Generally speaking if the particle sizes of the particles of refractory metal oxide are in the smaller size range as hereinbefore described larger amounts of the acid of a phosphorus oxide within the above-described ranges should be employed. On the other hand the larger particle size metal oxides will usually require lesser amounts of the acid of a phosphorus oxide. If less than 1% by weight of such acid is employed the compositions usually will not be physically stable on drying. Although more than 8% by weight of the acid may be employed there is no advantage and the compositions may be uneconomical.

The fourth essential component of the compositions of this invention is, as noted previously, a polycarboxylic acid. A wide variety of polycarboxylic acids may be employed including alkyl and aryl polycarboxylic acids for example di- and tri-alkyl carboxylic acids and di-, tri-, tetra- and hexaaryl carboxylic acids. Examples of di- and trialkyl carboxylic acids include for example, oxalic, malonic, succinic, malic, maleic, fumaric, racemic, glutaric, adipic, citric and tricarballylic acids. Examples of aryl di-, tri-, tetra- and hexaaryl carboxylic acids include phthalic, isophthalic, ter-phthalic, hemi-mellitic, trimellitic, trimesic, pyromellitic, mallophanic, prehnitic and mellitic acids. Of these alkyl and aryl polycarboxylic acids, oxalic and citric acid are preferred alkyl polycarboxylic acids, phthalic and isophthalic acids are preferred aryl carboxylic acids, and oxalic and citric acids are particularly preferred.

The amount of polycarboxylic acids employed in the compositions of this invention is an amount sufficient to maintain the compositions, which would otherwise set up into hard masses, in a moldable state and is usually from about 1% to about 8%, preferably from about 3% to about 5%, by weight of the composition. The amount of such polycarboxylic acid within the above-mentioned ranges will generally depend to some extent upon the amount of the acid of a phosphorus oxide, the particle size of the particles of the finely divided refractory metal oxide as well as the amount of such refractory metal oxide which it is desired to employ. Generally speaking the larger quantities of polycarboxylic acid will correspond to the larger quantities of an acid of phosphorus oxide which it is desired to employ. If less than 1% by weight of the polycarboxylic acid is employed the compositions may sometimes "set up," that is, become physically unstable. If more than about 8% by weight of polycarboxylic acid is employed, relatively prolonged firing times may be required to manufacture the ceramic article and the compositions will tend to be uneconomical due to cost.

The above-described compositions as noted hereinbefore will remain plastic or workable for prolonged periods of time and can be stored and shipped to the place of use, e.g. a manufacturer, or in the case of ramming mixes the site where the ore furnace repair is desired. However, if the aforementioned polycarboxylic acids are omitted from the compositions they will set up and form hard unworkable masses resembling solidified cement.

After preparation, compositions which do not contain the polycarboxylic acid are believed to undergo a reaction in which there is formed a metal phosphate corresponding to the metal of the refractory metal oxide. In this reaction substantially all of the acid of a phosphorus oxide is consumed or converted to a salt. In the case of the composition of the present invention such reaction apparently does not occur to any substantial extent. However, some reaction between a portion of the acid of the phosphorus oxide and the refractory metal oxide may occur when the compositions are permitted to stand for some time. This reaction is an incomplete reaction and does not appear to affect the moldability or workability of the compositions. Although the precise reaction is not known with certainty it is believed that a portion of the acid of the phosphorus oxide employed in the compositions of this invention reacts with water and the refractory metal oxide to form an acid salt of the refractory metal oxide and the acid of the phosphorus oxide. Such reaction as noted above involves only a portion of the refractory metal oxide, water and the acid of the phosphorus oxide and apparently achieves a reaction equilibrium. In any event, analysis of compositions of this invention when freshly prepared, contain the ingredients as added. However, upon standing for about seven days the compositions have been found to contain from between about 5% to about 15% by weight, based on the weight of the composition, of a refractory metal oxide-acid phosphorus (e.g. phosphate or phosphite) salt. Such reaction which takes place in compositions which have been stored for from one to several weeks or longer does not affect to any substantial extent the workability of the compositions or the quality of the end product refractory article produced therefrom.

Although chemical differences between refractory articles prepared from the compositions of this invention and those prepared from prior art compositions cannot be analytically detected the refractory articles prepared from the compositions of this invention are superior in strength, thermal resistance and in resistance to the corrosive environments encounteres in ore processing than previously known refractory articles. It has also been found possible, when desired and in certain instances, to incorporate in the compositions of this invention in addition to the above-described ingredients and in conjunction therewith minor amounts of well known refractory clays including any of the so-called ball clays and china clays (e.g. kaolin). The function of such clays is that of a lubricant or plasticizer and aids in the formation or molding to the shape desired in the final refractory article.

The term "plasticizer" as used herein is intended to mean and to include refractory clays such as ball clay and china clay which are well known and used in the refractory art.

Generally, when employed in the compositions of this invention such clays will be present in an amount of from about 3% to about 15% by weight, based on the weight of the total composition.

A preferred embodiment of a composition of this invention comprises a mixture of (1) water, (2) from about 70% to about 80% by weight of bauxite having a particle size and particle size distribution such that all or substantially all of the particles pass through a No. 4 mesh U.S. Standard screen, from about 10 to about 20% by weight of the particles are retained on a No. 8 mesh U.S. Standard screen, from about 10% to about 35% by weight of the particles are retained on a No. 14 mesh U.S. Standard screen, from about 20 to about 50% by weight of the particles are retained on a No. 20 mesh U.S. Standard screen, from about 40 to about 85% by weight of the particles are retained on a No. 45 mesh U.S. Standard screen, from about 45 to about 90% by weight of the particles are retained on a No. 70 mesh U.S. Standard screen, from about 50 to about 90% by weight of said particles are retained on a No. 100 mesh U.S. Standard screen and from about 70% to about 98% by weight of the particles are retained on a No. 200 mesh U.S. Standard screen, (3) from about 3% to about 5% by weight of orthophosphoric acid, (4) from about 3% to about 5% by weight of oxalic acid and (5) from about 3% to about 15% by weight of a plasticizer, for example, a ball clay or a china clay such as kaolin. Such preferred composition is moldable and is suitable for use per se as a ramming mix or it can be molded and heated to form refractory bricks using methods well known to those skilled in the art.

The present invention also provides processes for preparing the compositions hereinbefore described which comprises intimately admixing (1) water, (2) from about 25% to about 90% by weight of a hereinbefore described particulate refractory metal oxide, (3) from about 1% to about 8% by weight of the acid of a phosphorus oxide and (4) an amount sufficient to maintain the composition in a moldable state of a polycarboxylic acid. In the above processes the ingredients may be intimately admixed in any order so long as the polycarboxylic acid is added to the mixture before the reaction between the refractory metal oxide and an acid of a phosphorus oxide has taken place otherwise a moldable composition will not be produced if the composition is allowed to age.

It has been found preferable to prepare the compositions of this invention by intimately mixing the acid of a phosphorus oxide and the polycarboxylic acid to form an intimate mixture comprising these acids and thereafter to add and mix to the acid mixture the particulate refractory metal oxide. To this last mentioned mixture water may be added in an amount sufficient to provide to the composition the desired workability or consistency. Compositions so prepared are stable for prolonged periods of time under ambient conditions of temperature that is temperatures in the range of from between about 5° C. to about 40 C. The above processes are preferably carried out at room temperature, e.g. a temperature of from between about 20° C. to about 35° C. although temperatures as low as 0° C. up to above about 40° C. may also be employed.

In accordance with one advantageous embodiment of the processes of this invention a polycarboxylic acid such as oxalic acid is mixed with an acid of a phosphorus oxide such as, for example, orthophosphoric acid to provide a mixture of these acids. If desired water may be added to this mixture. Thereafter, from about 25 to about 90% by weight of an alumina, preferably a mixture of a hydrated alumina and calcined bauxite having a particle size and particle size distribution within the ranges hereinbefore described is intimately mixed with the acid mixture to provide the compositions of this invention containing the ingredients in the ranges hereinbefore described.

If water is not added to the acid mixture, or if insufficient water is added to the acid mixture, additional water may be added to the composition to provide the moldable consistency desired. The above compositions are suitable for use in the moldable state as ramming mixes, that is, they can be rammed into pits, cracks or fissures of ore processing furnaces to repair and to maintain such furnaces in a usable state. Alternatively, the compositions can be molded into brick like shapes of any desired size and configuration which, after firing, form refractory bricks which can be used as linings in ore processing furnaces. Such compositions can also be stored and shipped in a moldable state without danger of their setting up into a hard mass.

When it is desired to prepare compositions containing a plasticizer such as, for example, a ball clay or kaolin such compositions can be prepared by adding the ball clay to the mixture of the acid of a phosphorus oxide and oxalic acid or alternatively such plasticizer can be mixed with the refractory metal oxide prior to the addition of this material to the acid mixture. Such refractory clays have been found to have particular utility when it is desired to use the refractory compositions of this invention to form refractory bricks and appears to play some part in molding or shaping refractory bricks when they are pressed.

Any of the hereindescribed acids of phosphorus oxides and polycarboxylic acids can be mixed to form the acid mixture to which can be added any of the hereinbefore described particulate refractory metal oxides having the particle size and particle size distribution hereinbefore described and such compositions will, as previously noted, remain in a moldable state for periods up to six months and longer.

The following specific examples are intended to illustrate the invention and not to limit the scope thereof, parts and percentages being by weight unless otherwise specified.

*Example I*

A ramming mix was prepared by first mixing ground bauxite of various particle sizes until the bauxite (an $Al_2O_3$ ore) had the following particle size range and distribution.

| Particle size distribution (U.S. mesh standard screens): | Percent |
|---|---|
| On No. 8 | 17.5 |
| On No. 14 | 30 |
| On No. 20 | 45 |
| On No. 45 | 70 |
| On No. 70 | 82 |
| On No. 100 | 88 |
| On No. 200 | 96 |

To 9000 grams of the aforesaid mixture there was added 600 grams of a mixture containing equal parts by weight of oxalic acid and orthophosphoric acid and the ingredients were mixed in a Simpson müller mixer for 15 minutes. To the resulting mixture there was added 300 grams of water and mixing was continued for an additional 5 minutes until a plastic mass was obtained. A workability test was employed and designed to show percent deformation when a given force was supplied. This test is well known in the art and is described in vol. 13 pages 178–180 of "The Journal of the American Society of Testing Materials" (ASTM) published by the ASTM in Philadelphia in 1964. This test (designated as C 181–47) method covers a procedure for obtaining the workability index of plastic refractory material by measuring the plastic deformation of a molded test specimen when subjected to impacts. The data obtained in this test serve as a measure of the facility with which plastic refractory materials can be rammed or pounded into cracks or other voids in a furnace wall. In this test the higher numbers indicate the higher degree of plasticity or workability of the composition. The above composition as freshly prepared had a workability index of 33. Its value after six months of storage was 31. By way of contrast compositions identical to the one described above except that the oxalic acid had not been added had an initial workability index 31 and after one week had a workability index below 15 indicating that the composition had substantially lost its workability characteristics. After six months of storage the composition containing the oxalic acid was rammed into a crack in a furnace wall and heated to about 1500° C. for several hours after which a refractory lining was formed. The furnace containing the refractory lining has been in use for several months and no substantial change upon inspection has been seen in the surface of the furnace.

*Example II*

The procedure of Example I was repeated except that citric acid was employed instead of the oxalic acid and 25 grams of water were added in place of the 300 grams of water employed in Example I. The resulting mixture had a workability index of 37.2 and after six months storage had a workability index of 33. When used to repair an ore furnace as a ramming mix a hard ceramic surface was obtained after the ramming mix had been "fired" in the furnace.

*Example III*

A ramming mix was prepared by first mixing ground titanium di-oxide of various particle sizes until the titanium had the following size range and distribution.

| Particle size distribution (U.S. mesh standard screens): | Percent |
|---|---|
| On No. 8 | 17.5 |
| On No. 14 | 30 |
| On No. 20 | 45 |
| On No. 45 | 70 |
| On No. 70 | 82 |
| On No. 100 | 88 |
| On No. 200 | 96 |

To 9000 grams of the above mixture there was added 600 grams of a mixture containing equal parts by weight of phthalic acid and pyrophosphoric acid and the ingredients were mixed in a Simpson Müller mixer for 15 minutes. To the resulting mixture there was added 300 grams of water and mixing was continued for an additional 5 minutes until a plastic mass was obtained. The workability test designed to show percent deformation when a given force is supplied hereinbefore described was employed to determine the workability index.

The above composition as freshly prepared had a workability index of 33. Its value after six months of storage was 31. By way of contrast compositions identical to the one described above except that the phthalic acid had not been added had an initial workability index of 31 and after one week had a workability index below 15 indicating that the composition had substantially lost its workability characteristics. After six months of storage the composition containing the phthalic acid was rammed into a furnace heated to about 1500° C. for several hours after which a refractory lining was formed. The furnace containing the refractory lining has been in use for several months and no substantial change upon inspection has been seen in the surface of the furnace.

*Example IV*

A plastic refractory composition suitable for making bricks was prepared by first mixing ground bauxite of various particle sizes until the bauxite (an $Al_2O_3$ ore) had the following particle size ranges and distribution.

Particle size distribution (U.S.
mesh standard screens): Percent
On No. 8 _____ 13
On No. 14 _____ 20
On No. 20 _____ 28
On No. 45 _____ 44
On No. 70 _____ 54
On No. 100 _____ 60
On No. 200 _____ 70

To 9000 grams of the above mixture there was added 600 grams of a mixture containing equal parts by weight of oxalic acid and orthophosphoric acid and the ingredients were mixed in a Simpson Müller mixer for 15 minutes. To the resulting mixture there was added 300 grams of water and mixing was continued for an additional 5 minutes until a plastic mass was obtained.

The mixture was tested for workability in accordance with the ASTM workability test hereinbefore described. The above composition, as freshly prepared, had a workability index of 44. This workability after six months of storage was 32. By way of contrast the compositions identical to the one described above with the exception that the oxalic acid was omitted had an initial workability index of 41 and after one week had a workability index of 18 indicating that a substantial reaction had taken place between the phosphoric acid and the alumina of the bauxite. The composition containing the oxalic acid was after six months of storage placed into bricks and fired to produce hard thermal resistant, corrosion resistant refractory articles suitable for use in ore furnace construction in the lining of the furnace walls.

*Example V*

The procedure of Example IV was repeated except that metaphosphoric acid was employed in place of the orthophosphoric acid employed in Example IV and glutaric acid was employed in place of the oxalic acid used in that example. The above composition as freshly prepared had a workability index determined as hereinbefore described of 37. Its workability index value after 5 months of storage was 32. The composition was placed in molds under pressure to obtain brick shaped articles which were thereafter fired to produce refractory bricks having excellent bond strength which were also thermal resistant and resistant to corrosion by acids and alkalis.

*Example VI*

A plastic refractory composition suitable for making bricks was prepared by first mixing zirconium oxide which had been ground to various particle sizes in such an amount that the mixture had the following particle size ranges and distribution.

Particle size distribution (U.S.
mesh standard screens): Percent
On No. 8 _____ 14
On No. 14 _____ 21
On No. 20 _____ 29
On No. 45 _____ 41
On No. 70 _____ 56
On No. 100 _____ 62
On No. 200 _____ 74

To 9000 grams of the above mixture there was added 800 grams of a mixture containing equal parts by weight of oxalic acid and an orthophosphoric acid solution containing 85% orthophosphoric acid and 15% water. The above ingredients were mixed in a Simpson Müller mixer for 15 minutes. To the resulting mixture there was added 300 grams of water and mixing was continued for an additional 5 minutes until a plastic mass was obtained. The mixture was tested for workability in accordance with the ASTM workability test hereinbefore described. The above composition as freshly prepared had a workability index of 42. The composition after six months storage had a workability index of 31. By way of contrast compositions identical to the one described above with the exception that the oxalic acid was omitted had an additional workability index of 39 and after two weeks had set into a hard mass which made it impossible to conduct the ASTM evaluation indicating that a reaction had taken place between the phosphoric acid and the zirconium oxide.

The composition containing the oxalic acid was, after six months of storage, pressed into bricks and fired to produce hard thermal and corrosion resistant refractory bricks suitable for use in furnace construction and in the lining of furnace ducts exposed to corrosive atmosphere.

The compositions of this invention maintain their plastic and moldable condition for a prolonged period of time and can be shipped and/or stored until it is desired to produce the refractory article. The compositions thus represent a major advance in the art of refractory compositions since heretofore unless stringent conditions were observed it was impossible to produce stable plastic refractory compositions.

*Example VII*

To a portion of the composition of Example VI there was added after the addition of the water, 3% by weight of a Kentucky ball clay and the mixing was continued for an additional 15 minutes. Compositions so produced had an initial workability index of 37, were stable after 5 minutes when they had a workability index value of 31 and when made into bricks formed bricks which had superior bond strength, thermal stability and corrosion resistance to about the same extent as the bricks obtained from the compositions of Example VI.

What is claimed is:

1. A composition suitable for the manufacture of refractories consisting of a mixture of (1) water, (2) from about 70% to about 80% by weight of bauxite having a particle size and particle size distribution such that substantially all of the particles will pass through a No. 4 mesh U.S. Standard screen, from about 10 to about 20% by weight of said particles are retained on a No. 8 mesh U.S. Standard screen, from about 10 to about 35% by weight of said particles are retained on a No. 14 mesh U.S. Standard screen, from about 20 to about 50% by weight of said particles are retained on a No. 20 mesh US. Standard screen, from about 40% to about 85% by weight of said particles are retained on a No. 45 mesh U.S. Standard screen, from about 45% to about 90% by weight of said particles are retained on a No. 70 mesh U.S. Standard screen, from about 50 to about 90% by weight of said particles are retained on a No. 100 mesh U.S. Standard screen and from about 70% to about 98% by weight of said particles are retained on a No. 200 mesh U.S. Standard screen, (3) from about 3% to about 5% by weight of orthophosphoric acid, (4) from about 3% to about 5% by weight of oxalic acid and (5) from about 3% to about 15% by weight of a plasticizer selected from the group consisting of ball clays and china clays.

2. A composition suitable for the manufacture of refractories consisting of a mixture of (1) from about 1% to about 10% by weight, based on the weight of the composition, of water, (2) from about 1% to about 8% by weight, based on the weight of the composition, of an acid of a phosphorus oxide, (3) from about 1% to about 8% by weight, based on the weight of the composition, of a polycarboxylic acid, and (4) the remainder of said composition consisting of an inorganic material selected from the group consisting of (a) aluminum oxide and (b) a mixture of aluminum oxide and a refractory clay, said refractory clay consisting of from about 3% to about 15% by weight, of the weight of the composition.

3. A composition as in claim 2, in which the acid of the phosphorus oxide is orthophosphoric acid.

4. A composition as in claim 3, wherein the polycarboxylic acid is an aliphatic dicarboxylic acid.

5. A composition as in claim 4 wherein the aliphatic dicarboxylic acid is oxalic acid.

6. A composition suitable for the manufacture of refractories consisting of a mixture of (1) from about 1% to about 10% by weight, based on the weight of the composition, of water, (2) an inorganic material, as hereinafter defined, having particles of a size and size distribution such that substantially all of the particles pass through a No. 4 mesh U.S. Standard screen, from about 10 to about 20% by weight of said particles are retained on a No. 8 mesh U.S. Standard screen, from about 10 to about 35% by weight of said particles are retained on a No. 14 mesh U.S. Standard screen, from about 20 to about 50% by weight of said particles are retained on a No. 20 mesh U.S. Standard screen, from about 40% to about 85% by weight of said particles are retained on a No. 45 mesh U.S. Standard screen, from about 45% to about 90% by weight of said particles are retained on a No. 70 mesh U.S. Standard screen, from about 50 to about 90% by weight of said particles are retained on a No. 100 mesh U.S. Standard screen and from about 70% to about 98% by weight of said particles are retained on a No. 200 mesh U.S. Standard screen and (3) from about 1% to about 8% by weight of orthophosphoric acid and (4) from about 1% to about 8% by weight of a polycarboxylic acid, said inorganic material making up the remainder of said composition and being selected from the group consisting of (a) aluminum oxide and (b) a mixture of aluminum oxide and a refractory clay, said refractory clay consisting of from about 3% to about 15% by weight, of the weight of the composition.

7. A composition as in claim 6, wherein said inorganic material is bauxite and said polycarboxylic acid is oxalic acid.

8. A process for the manufacture of workable refractory compositions which comprises intimately admixing (1) from about 1% to about 10% by weight, based on the weight of the composition, of water, (2) an inorganic material as hereinafter defined, (3) from about 1.0 to about 8% by weight of an acid of a phosphorus oxide and (4) from about 1% to about 8% by weight, based on the weight of the composition, of a polycarboxylic acid, with the proviso that said polycarboxylic acid is added to the mixture before any reaction has taken place between said inorganic material and said first-mentioned acid, said inorganic material making up the remainder of said composition and being selected from the group consisting of (a) aluminum oxide and (b) a mixture of aluminum oxide and a refractory clay, said refractory clay consisting of from about 3% to about 15% by weight, of the weight of the composition.

9. A process which comprises intimately mixing (1) an acid of a phosphorus oxide and a polycarboxylic acid to form an intimate mixture comprising said acids, the amount of each acid separately constituting from about 1% to about 8% by weight based on the weight of the total composition, and (2) adding and mixing with said acid mixture an inorganic material hereinafter defined, and thereafter adding to said last-mentioned mixture from about 1% to about 10% by weight, based on the weight of the composition, of water, said inorganic material making up the remainder of said composition and being selected from the group consisting of (a) aluminum oxide and (b) a mixture of aluminum oxide and a refractory clay, said refractory clay consisting of from about 3% to about 15% by weight, of the weight of the composition.

10. A process as in claim 9, wherein said acid of the phosphorus oxide is orthophosphoric acid.

11. A process as in claim 9, wherein said polycarboxylic acid is oxalic acid.

12. A process for the manufacture of a workable refractory composition which comprises intimately mixing from about 1% to about 8% by weight of an acid of a phosphorous oxide with from about 1% to about 8% by weight of a polycarboxylic acid thereby forming a mixture of said acids; adding to said mixture an inorganic material as hereinafter defined and having particles of a size and size distribution such that substantially all of the particles pass through a No. 4 mesh U.S. Standard screen, from about 10 to about 20% by weight of said particles are retained on a No. 8 mesh U.S. Standard screen, from about 10 to about 35% by weight of said particles are retained on a No. 14 mesh U.S. Standard screen, from about 20 to about 50% by weight of said particles are retained on a No. 20 mesh U.S. Standard screen, from about 40% to about 85% by weight of said particles are retained on a No. 45 mesh U.S. Standard screen, from about 45% to about 90% by weight of said particles are retained on a No. 70 mesh U.S. Standard screen, from about 50 to about 90% by weight of said particles are retained on a No. 100 mesh U.S. Standard screen and from about 70% to about 98% by weight of said particles are retained on a No. 200 mesh U.S. Standard screen and thereafter adding to said mixture from about 1% to about 10% by weight, based on the weight of the composition of water, said inorganic material making up the remainder of said composition and being selected from the group consisting of (a) aluminum oxide and (b) a mixture of aluminum oxide and a refractory clay, said refractory clay consisting of from about 3% to about 15% by weight, of the weight of the composition.

13. A process as in claim 12 wherein said acid of a phosphorus oxide is orthophosphoric acid and said polycarboxylic acid is oxalic acid.

14. A process as in claim 12, wherein the inorganic material is a mixture of aluminum oxide and refractory clay selected from the group consisting of ball clays and china clays.

15. A process which comprises intimately mixing from about 3% to about 5% by weight, based on the weight of the final composition, of orthophosphoric acid and from about 3% to about 5% by weight, based on the weight of the composition, of oxalic acid; adding to said mixture a mixture of (a) from about 3% to about 15% by weight, based on the weight of the composition, of kaolin, and (b) an oxide of aluminum having particle size and particle size distribution such that substantially all of the particles pass through a No. 4 mesh U.S. Standard screen, from about 10 to about 20% by weight of said particles are retained on a No. 8 mesh U.S. Standard screen, from about 10 to about 35% by weight of said particles are retained on a No. 14 mesh U.S. Standard screen, from about 20 to about 50% by weight of said particles are retained on a No. 20 mesh U.S. Standard screen, from about 40% to about 85% by weight of said particles are retained on a No. 45 mesh U.S. Standard screen, from about 45% to about 90% by weight of said particles are retained on a No. 70 mesh U.S. Standard screen, from about 50 to about 90% by weight of said particles are retained on a No. 100 mesh U.S. Standard screen and from about 70% to about 98% by weight of said particles are retained on a No. 200 mesh U.S. Standard screen; thereafter adding to said mixture from about 3% to about 7% by weight, based on the total weight of the composition, of water, whereby there is provided a moldable composition, said aluminum oxide making up the remainder of the composition.

References Cited by the Examiner

UNITED STATES PATENTS 2,220,411  11/1940  Kinzie et al. _____ 106—57

TOBIAS E. LEVOW, *Primary Examiner.*

J. E. POER, *Assistant Examiner.*